United States Patent
Breslin et al.

(10) Patent No.: US 7,827,448 B1
(45) Date of Patent: Nov. 2, 2010

(54) IT ANALYSIS INTEGRATION TOOL AND ARCHITECTURE

(75) Inventors: James A. Breslin, Lenexa, KS (US); James T. Stueve, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 732 days.

(21) Appl. No.: 11/342,091

(22) Filed: Jan. 27, 2006

(51) Int. Cl.
*G09F 11/00* (2006.01)

(52) U.S. Cl. .............................. 714/47; 714/4; 709/223; 709/224

(58) Field of Classification Search .................... 714/26, 714/47, 4, 38, 48; 709/223, 224
See application file for complete search history.

(56) References Cited

U.S. PATENT DOCUMENTS

| | | | | |
|---|---|---|---|---|
| 6,467,052 B1 * | 10/2002 | Kaler et al. | ................... | 714/39 |
| 6,671,830 B2 * | 12/2003 | Lowell et al. | ................... | 714/39 |
| 7,051,098 B2 * | 5/2006 | Masters et al. | ............... | 709/224 |
| 7,127,507 B1 * | 10/2006 | Clark et al. | ................... | 709/224 |
| 2002/0184555 A1 * | 12/2002 | Wong et al. | ..................... | 714/4 |
| 2003/0191989 A1 * | 10/2003 | O'Sullivan | ................... | 714/47 |
| 2004/0078723 A1 * | 4/2004 | Gross et al. | ................... | 714/47 |

* cited by examiner

*Primary Examiner*—Yolanda L Wilson (57) ABSTRACT

A system for determining status information based on one or more reporting applications providing a status summary. The system includes an underlying application operable to provide status, and a reporting application operable to receive the status information and generate a status report including a status summary from the status information. The system also includes a middleware layer operable using the status, and an interface in communication with the middleware layer to display a status indicator. The status indicator is based on the status summary. The interface includes a plurality of status indicators operable when selected for a data display to appear in the interface, the data display being related to the status report from which the status summary was generated.

16 Claims, 4 Drawing Sheets

IT ANALYSIS INTEGRATION TOOL AND ARCHITECTURE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to reporting a status, and more particularly, but not by way of limitation, to systems and methods for collecting status information from multiple disparate sources, displaying a summary of the status information, and providing a simple manner for retrieving more detailed status information.

BACKGROUND OF THE INVENTION

An enterprise might conduct multiple projects designed to achieve multiple, disparate goals. Each project may have a different status with respect to degree of completion, financial targets, resource allocation, and other project parameters. Operational parameters, such as a percentage of systems functioning as intended, can also have a wide range of statuses. Executives within an enterprise typically wish to be apprised of project status, operational status, and other types of status in a straightforward, easily understood manner.

SUMMARY OF THE INVENTION

An embodiment of the present disclosure provides a system for determining status information based on one or more reporting applications providing a status summary. The system includes an underlying application operable to provide status, and a reporting application operable to receive the status information and generate a status report including a status summary from the status information. The system also includes a middleware layer operable using the status, and an interface in communication with the middleware layer to display a status indicator. The status indicator is based on the status summary. The interface includes a plurality of status indicators operable when selected for a data display to appear in the interface, the data display being related to the status report from which the status summary was generated.

In another embodiment, a method is provided determining status information based on one or more reporting applications providing a status summary. The method includes an underlying application providing status information to a reporting application. The reporting application generates a status report from the status information and generates the status summary from the status report. The method provided for the reporting application pushing the status summary to a middleware layer, and the middleware layer storing the status summary in a reporting data store. The method also includes the middleware layer providing a status indicator based on the status summary stored in the reporting data store.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Several commercial, off-the-shelf products are available to consolidate information from multiple sources and perform analysis and reporting functions on the data, such as providing summaries of project status and/or operational status. For example, MicroStrategy offers the Business Intelligence platform of tools and Business Objects offers the Crystal Reports suite of tools. Other similar products will be familiar to one of skill in the art. In an enterprise that uses a plurality of such products, each product may provide users with a summary of a different set of data. A user wishing to retrieve summaries of multiple sets of data might need to launch each product individually, cause a report to be generated in each product, and then view the report results in a different interface for each product. Results from different products typically cannot be viewed simultaneously. Reports that analyze a large amount of data execute for an extended length of time before returning results.

Embodiments of the present disclosure allow status information from disparate sources, such as reporting applications, to be loaded, such as in advance, into an intermediate data store. In some embodiments, both the pre-run reports and the status information are then stored in the intermediate data store and made available to middleware applications. This allows the user of middleware applications to quickly evaluate the status of these projects or other activities, via the status information. The use may then easily access the related reports, which may have been previously generated and stored or by dynamically re-generating the reports using the reporting applications.

In one embodiment, the color of a status indicator on a computer screen indicates status information. For example, a green status indicator indicates a parameter that meets or exceeds an acceptable level, a red status indicator indicates a parameter in an unacceptable range, and a yellow status indicator indicates a parameter between the acceptable and unacceptable levels. The computer screen may be provided that simultaneously displays several such status indicators, each related to data from a different source. In this way, a user can easily discern project statuses, operational statuses, and other statuses even when those statuses are being reported by disparate reporting applications.

In an embodiment, a user can retrieve detailed information about a status by selecting a status indicator, for example by executing a mouse click on the status indicator in the computer screen. For example, clicking on a status indicator causes a report, a graph, a spreadsheet, or some other type of data presentation to appear on the screen. This data presentation displays the detailed information from which the summary indicated by the status indicator was derived.

Figure 1:
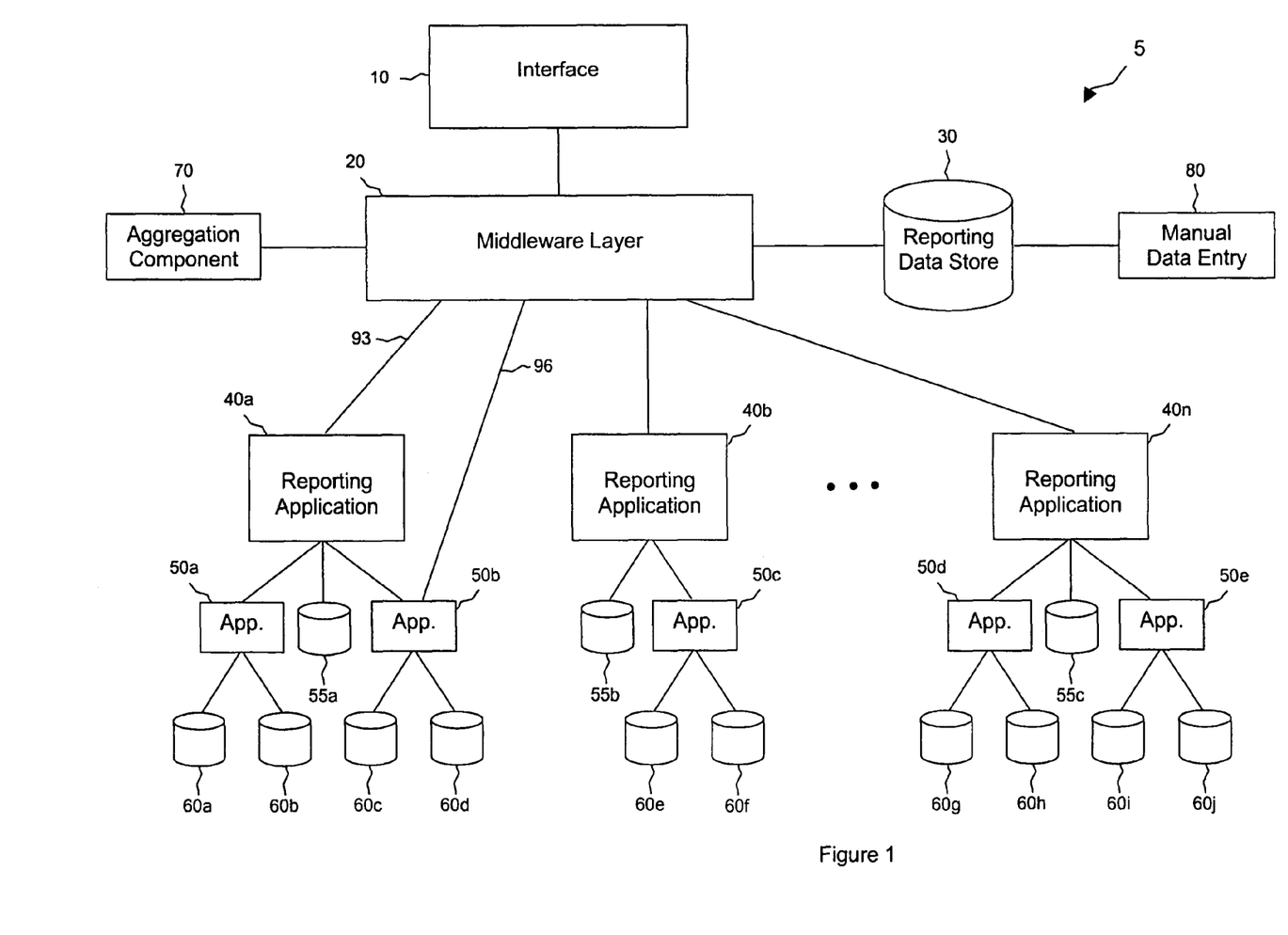
FIG. 1 is a block diagram of a system for displaying a status summary according to one embodiment of the present disclosure.

FIG. 1 illustrates an embodiment of a system 5 that allows such status indicators to be displayed. An enterprise may use a plurality of commercial, off-the shelf applications 50 to perform various data manipulation activities. The applications 50 might include HP OVIS, various Oracle applications, various Microsoft applications, or other applications that collect or manipulate data related to project status, operational status, or other types of status. The applications 50 may also include products developed internally by the enterprise. Each application 50 may have access to one or more data stores 60 that maintain the data manipulated by the applications 50.

In this embodiment, each application 50 provides data to one of a plurality of reporting applications 40. The reporting applications 40 include MicroStrategy Business Intelligence tools, Business Objects Crystal Reports tools, or other similar products. The reporting applications 40 also include products developed internally by the enterprise. In an embodiment, the reporting applications 40 receive data from the underlying applications 50, analyze the data, create reports based on the data, and use predefined business rules to derive status summaries from the reports. In another embodiment, the underlying applications 50 generate the status summaries. In some cases, the reporting applications 40 receive data directly from a data store 55 rather than from an underlying application 50.

The status summaries are sent to a middleware layer 20, which will be described in detail below. The middleware layer 20 is capable of receiving data from multiple disparate reporting applications 40, which use different data formats or different communication protocols. The middleware layer 20 stores the status summaries in a reporting data store 30. As described below, additional data is stored in the reporting data store 30 to specify how the status summaries should be displayed and where more detailed information about the status summaries can be found.

The status summaries and the additional data are used to create a display on an interface 10 that can graphically depict the status summaries. For example, a status indicator may appear on the interface 10 for each status summary provided by a reporting application 40. Each status indicator might take on a different color, such as red, green, or yellow, to provide a graphical representation of a status summary. In other embodiments, other colors, other numbers of colors, or graphical representations other than color could be used to symbolize the status summaries.

By viewing the interface 10, a user can see multiple status indicators representing multiple status summaries that were derived from multiple, disparate reporting applications 40. The user need not be aware of which reporting application 40 provided which status summary. For example, reporting application 40a might be a MicroStrategy Business Intelligence tool and reporting application 40b might be a Business Objects Crystal Reports tool. Reporting application 40a creates a status summary based on data provided by one or more underlying applications 50a and/or 50b and reporting application 40b creates a status summary based on data provided by underlying application 50c. The status indicators in the interface 10 that are based on these status summaries may have a similar appearance even though one was derived from a MicroStrategy Business Intelligence tool and one was derived from a Business Objects Crystal Reports tool.

Figure 2:
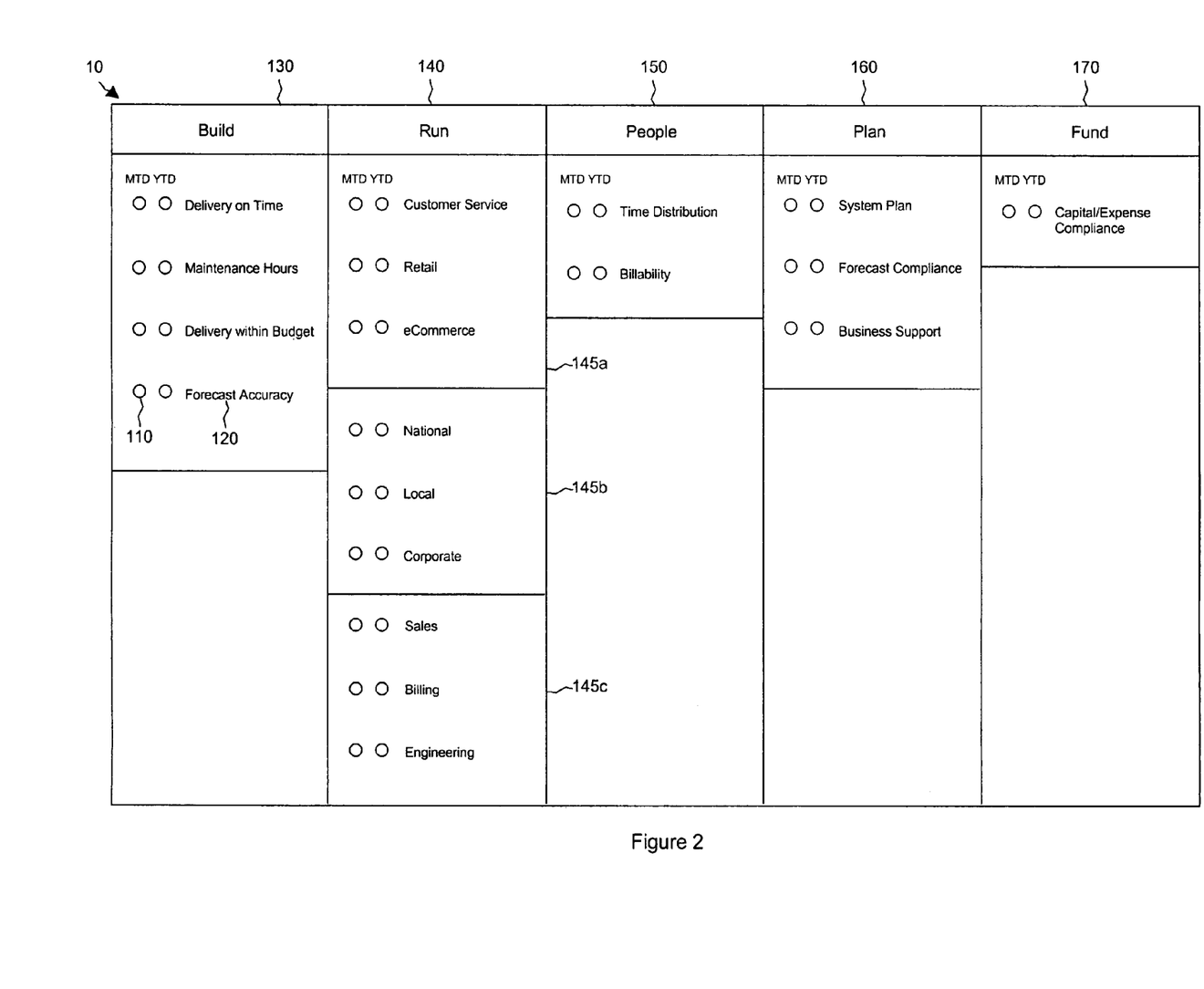
FIG. 2 is a diagram of an interface for displaying a plurality of status summaries according to one embodiment of the present disclosure.

FIG. 2 illustrates an embodiment of a display that appears on an interface 10. A plurality of status indicators 110 symbolize status summaries for a plurality of parameters 120. It should be understood that the parameters 120 shown in FIG. 2 are only examples and that other parameters could appear in the interface 10. In this embodiment, two status indicators 110 are associated with each parameter 120, one for a month to date (MTD) summary and one for a year to date (YTD) summary. In other embodiments, other numbers of status indicators 110 could be associated with each parameter 120. As mentioned previously, the status indicators 110 may take on different colors to symbolize different status summaries. In other embodiments, the status indicators 110 may indicate status summaries in different manners.

The interface 10 would typically, but not necessarily, be a web-based graphical user interface that appears in a web browser. A user updates the status indicators 110 by pressing a refresh button, or similar input, in the web browser. When the web page is refreshed, updated status data might be retrieved from the reporting data store 30, as described below, and be displayed in the interface 10.

The parameters 120 could be grouped into categories to promote readability and comprehension. In the embodiment of FIG. 2, five categories are used: Build 130, Run 140, People 150, Plan 160, and Fund 170. Build 130 may deal with project-related parameters, Run 140 deals with operations-related parameters, People 150 deals with human resources-related parameters, Plan 160 deals with strategic and/or long-term planning-related parameters, and Fund 170 deals with finance-related parameters. In other embodiments, other categories could be used, other numbers of categories could be used, or no categories might be present. Also, the example parameters 120 could be placed in different categories.

In an embodiment, each category has one or more sub-categories. For example, the Run category 140 has three sub-categories 145. The other categories depicted in FIG. 2 are not shown with sub-categories, but in other embodiments could have a plurality of sub-categories. Each category and/or sub-category represents data derived from a different reporting application 40. For example, Build 130 might contain status indicators 110 related to data derived from a MicroStrategy Business Intelligence tool, while Run 140 might contain status indicators 110 related to data derived from a Business Objects Crystal Reports tool. In other embodiments, no relationship between categories and data sources may exist. For example, each parameter 120 might be related to a different reporting application 40.

The interface 10, in this embodiment, has one or more sub-interfaces. That is, if a user selects a category or sub-category within the interface 10, a sub-interface appears containing other status indicators that pertain to the selected category or sub-category.

In an embodiment, the interface 10 can act as a data input medium as well as a data display medium. For example, when the interface 10 is displayed on a computer screen, a user uses a mouse to click on or hover over a parameter 120. A popup window or similar display then appears on the screen and provide a definition of the selected parameter 120.

The status indicators 110 also act as data inputs. For example, a user clicks on a status indicator 110 to retrieve detailed information about the status summary symbolized by the status indicator 110. As mentioned previously, the reporting applications 40 typically generate detailed reports based on the data received from the underlying applications 50. The reporting applications 40 then use predefined business rules to derive the status summaries from the detailed reports. In an embodiment, selecting a status indicator 110, by means of a mouse click, for example, causes the detailed report from which a status summary was derived to appear. In other embodiments, the information that appears could be a chart, graph, or other data display that is derived from the detailed report.

For example, if a status indicator 110 is red, indicating that its associated parameter 120 is in an unacceptable range, a user might wish to view the detailed information from which the status summary symbolized by the red indicator 110 was derived. If the user clicks on the red status indicator 110, a report, a graph, a spreadsheet, or some other display may appear showing the detailed data. The user is then able to observe this detailed information and determine the cause for the red status indicator 110.

In one embodiment, the detailed information that appears when a status indicator 110 is selected is retrieved from a reporting application 40. In another embodiment, the detailed information is retrieved from an underlying application 50. For example, returning to FIG. 1, a first path 93 might be followed from the middleware layer 20 to reporting application 40a to retrieve the detailed information. Alternatively, a second path 96 may be followed from the middleware layer 20 to underlying application 50b.

The middleware layer 20 acts as an intermediary for data moving between the interface 10, the reporting data store 30, the reporting applications 40, and the underlying applications 50. The middleware layer 20 can accept status summaries from multiple reporting applications 40, regardless of the data format or communication protocol used by the reporting applications 40, and can send the status summaries to the reporting data store 30.

When a display of status indicators 110 is first started or is updated in the interface 10, the middleware layer 20 can retrieve the appropriate status summaries from the reporting data store 30. The middleware layer 20 can then cause the status indicators 110 to assume the appearances that correspond to the status summaries. The middleware layer 20 contains rules that dictate how the status indicators 110 should symbolize the status summaries. For example, a rule may specifies how a status summary number should be converted to a status indicator color. Alternatively, data in the reporting data store 30 could specify the appearance that a particular status indicator 110 related to a particular status summary should take on.

When a user selects a status indicator 110 in the interface 10 to retrieve detailed information about a status summary, the middleware layer 20 can accept the mouse click (or equivalent input) and retrieve the appropriate information. As described below, data regarding the location of the appropriate information is maintained in the reporting data store 30. Upon accepting the click, the middleware layer 20 retrieves the location from the reporting data store 30 and retrieves the information from the indicated location. In some cases as shown in FIG. 1, the middleware layer 20 might follow a first path 93 and retrieve the information from reporting application 40a. In other cases, the middleware layer 20 follows a second path 96 and retrieves the information from an underlying application 50b.

As mentioned previously, the business rules that derive a status summary from a detailed report resides in a reporting application 40 or an underlying application 50. In an alternative embodiment, these business rules reside in the middleware layer 20. That is, a reporting application 40 or an underlying application 50 provide a detailed report to the middleware layer 20 and the middleware layer 20 applies one or more business rules to derive a status summary from the detailed report.

The reporting data store 30 contains the status summaries and associated data. The use of the reporting data store 30 allows status summaries to be quickly retrieved without the need to launch a reporting application 40 or an underlying application 50. Each row of data in the reporting data store 30 might correspond to a different status summary and each column in the reporting data store 30 might correspond to a different data element related to the status summary. For example, one column contains the status summary data, another column indicates where in the interface 10 the status summary should be displayed, and another column contains a link that indicates where the detailed information from which the summary was derived is located. That is, one column indicates which reporting application 40 or which underlying application 50 the detailed information should be retrieved from and where in the reporting application 40 or underlying application 50 the detailed information can be found.

If an additional status indicator 110 is to be added to the display in the interface 10, a new row can be added to the reporting data store 30. The new row would typically contain information regarding where the new status indicator 110 should appear in the interface 10, where detailed information related to the status summary associated with the status indicator 110 can be found, and other information as described above.

In an embodiment, the status summaries in the reporting data store 30 are updated when a modification is made to the detailed data on which the summaries are based. That is, when data in a data store 60 or a data store 55 is modified, a report incorporating the new data might automatically be run. A status summary is then automatically derived from the report. The newly derived status summary is then automatically pushed to the middleware layer 20. In some embodiments, the status summary and/or other information and reports may be pulled by the middleware layer 20. The middleware layer 20 then automatically updates the reporting data store 30 with the new status summary. The status indicator 110 corresponding to the updated status summary is updated when a user refreshes a web page that displays the status indicator 110. The summaries may also be run nightly, weekly, or perhaps at other intervals to check for changes and pull the updated summaries if they exist.

When a user selects a status indicator 110 to request detailed information, the requested information might be retrieved from a cache or might be generated at the time of the request. The cache would typically be a component of a reporting application 40 or an underlying application 50. For information derived from reports that require an extended period of time to run, it may be desirable to store the information in a cache. Storing the information would allow an almost immediate retrieval of detailed information when a user selects a status indicator 110. Running such a report at the time of a request may cause an unacceptable delay in the appearance of the detailed information.

For reports that run quickly, it may be desirable to generate the reports at the time a request for detailed information is made. In one embodiment, a field in the reporting data store 30 could specify whether the detailed information is retrieved from a cache or generated at the time of a request. In an alternative embodiment, the middleware layer 20 may be provided with the intelligence to determine the most appropriate source for the detailed information.

In the embodiments discussed above, each status indicator 110 symbolizes a status summary provided by a single reporting application 40 or a single underlying application 50. In various alternative embodiments, status summaries provided by a plurality of reporting applications 40 and/or underlying applications 50 can be combined into an aggregated status summary. For example, a status summary generated by a MicroStrategy Business Intelligence tool may be combined with a status summary generated by a Business Objects Crystal Reports tool to derive an aggregated status summary combining elements of both tools.

The combination of status summaries from disparate sources may be carried out by an aggregation component 70 after the individual status summaries have been pushed to the middleware layer 20. While the aggregation component 70 is depicted in FIG. 1 as a separate element from the middleware layer 20, the aggregation component 70 could be internal to the middleware layer 20. In either case, status summaries can be sent to the aggregation component 70 from a plurality of reporting applications 40 and/or underlying applications 50. The aggregation component 70 then follows one or more business rules to combine the status summaries into an aggregated status summary. The aggregation process may include weighting of the individual status summaries to account for their relative importance.

The aggregation component 70 stores the aggregated status summary, via the middleware layer 20, in the reporting data store 30. When a display of status indicators 110 is first started or is updated in the interface 10, the middleware layer 20 can retrieve the aggregated status summary from the reporting data store 30 and cause the appropriate status indicator 110 to assume an appearance that corresponds to the aggregated status summary.

Alternatively, the combination of status summaries from disparate sources may occur in the reporting data store 30. For example, a first row in the reporting data store 30 could contain a status summary from a first reporting application 40 or a first underlying application 50 and a second row could contain a status summary from a second reporting application 40 or a second underlying application 50. The reporting data store 30 may contain or have access to one or more business rules that specify how the data in the first and second rows can be combined into an aggregated status summary. After the business rules are applied, the aggregated status summary might be stored in a third row in the reporting data store 30 and be available for display in the interface 10.

When status summaries from disparate sources are combined, a user would be able to click on a status indicator 110 that corresponds to the aggregated status summary to retrieve detailed information about the aggregated status summary. In an embodiment, clicking on the aggregated status summary status indicator 110 calls up additional status indicators 110 representing the individual status summaries from which the aggregated status summary was derived.

For example, clicking on a yellow aggregated status summary status indicator 110 causes a red status indicator 110 and a green status indicator 110 to appear, where the red status indicator 110 represents a status summary derived from a MicroStrategy Business Intelligence tool and the green status indicator 110 represents a status summary derived from a Business Objects Crystal Reports tool. The user then clicks on the red status indicator 110, in the manner described above, to call up the detailed information from which the status summary symbolized by the red status indicator 110 was derived.

In some cases, a reporting application 40 or an underlying application 50 might not be capable of automatically generating a desired status summary. For example, some status information requires subjective human judgments that cannot feasibly be replicated by an automated application. Manual entry of data into the reporting data store 30 may be necessary in such cases. In an embodiment, a manual data entry component 80 is present to allow the entry of such data into the reporting data store 30. Data entered via the manual data entry component 80 is available for display in the interface 10 in the same manner as data automatically placed in the reporting data store 30 by the middleware layer 20.

Figure 3:
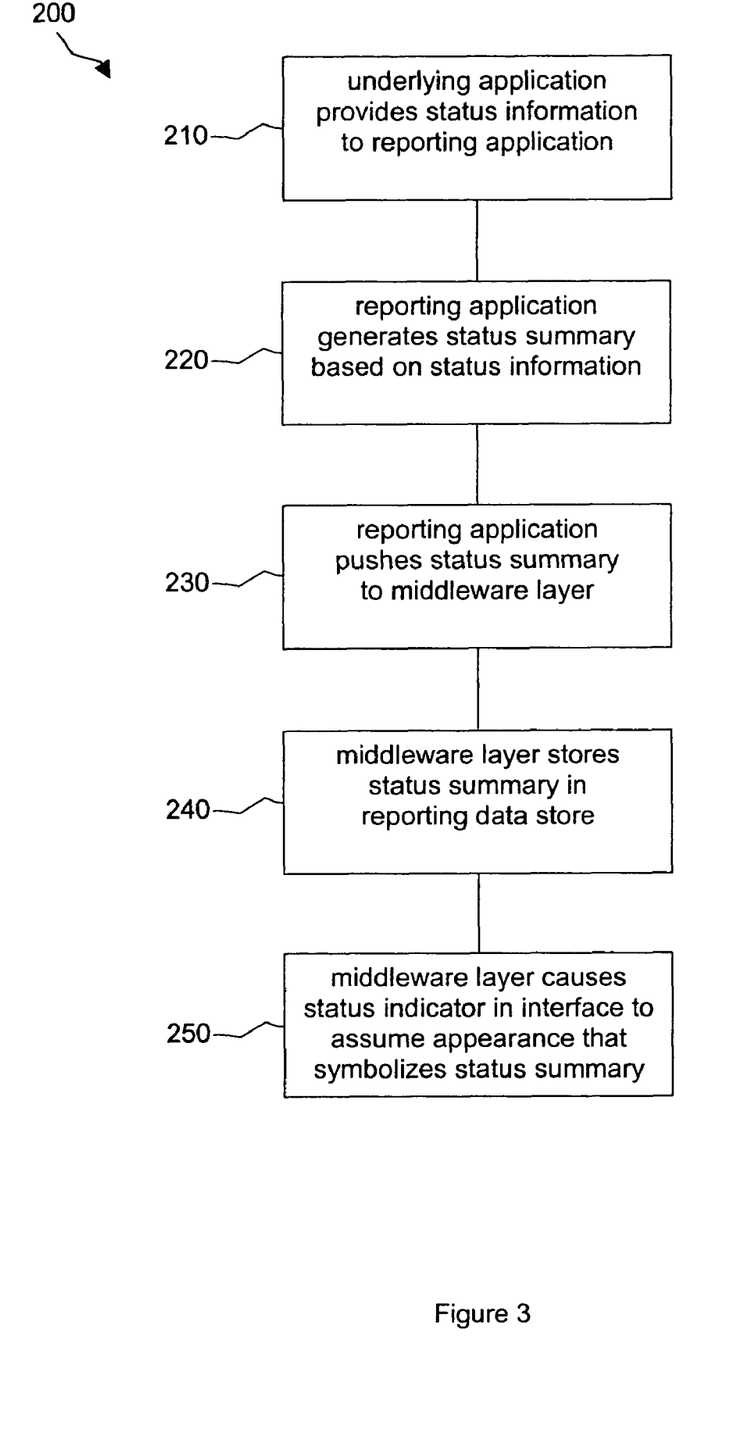
FIG. 3 is a flow chart of a method for displaying a status summary according to one embodiment of the present disclosure.

FIG. 3 illustrates an embodiment of a method 200 for displaying a status summary. In box 210, an underlying application provides status information to a reporting application. In box 220, the reporting application generates a status summary based on the status information. In box 230, the reporting application automatically pushes the status summary to a middleware layer. In box 240, the middleware layer stores the status summary in a reporting data store. In box 250, the middleware layer causes a status indicator in an interface to assume an appearance that symbolizes the status summary stored in the reporting data store.

Figure 4:
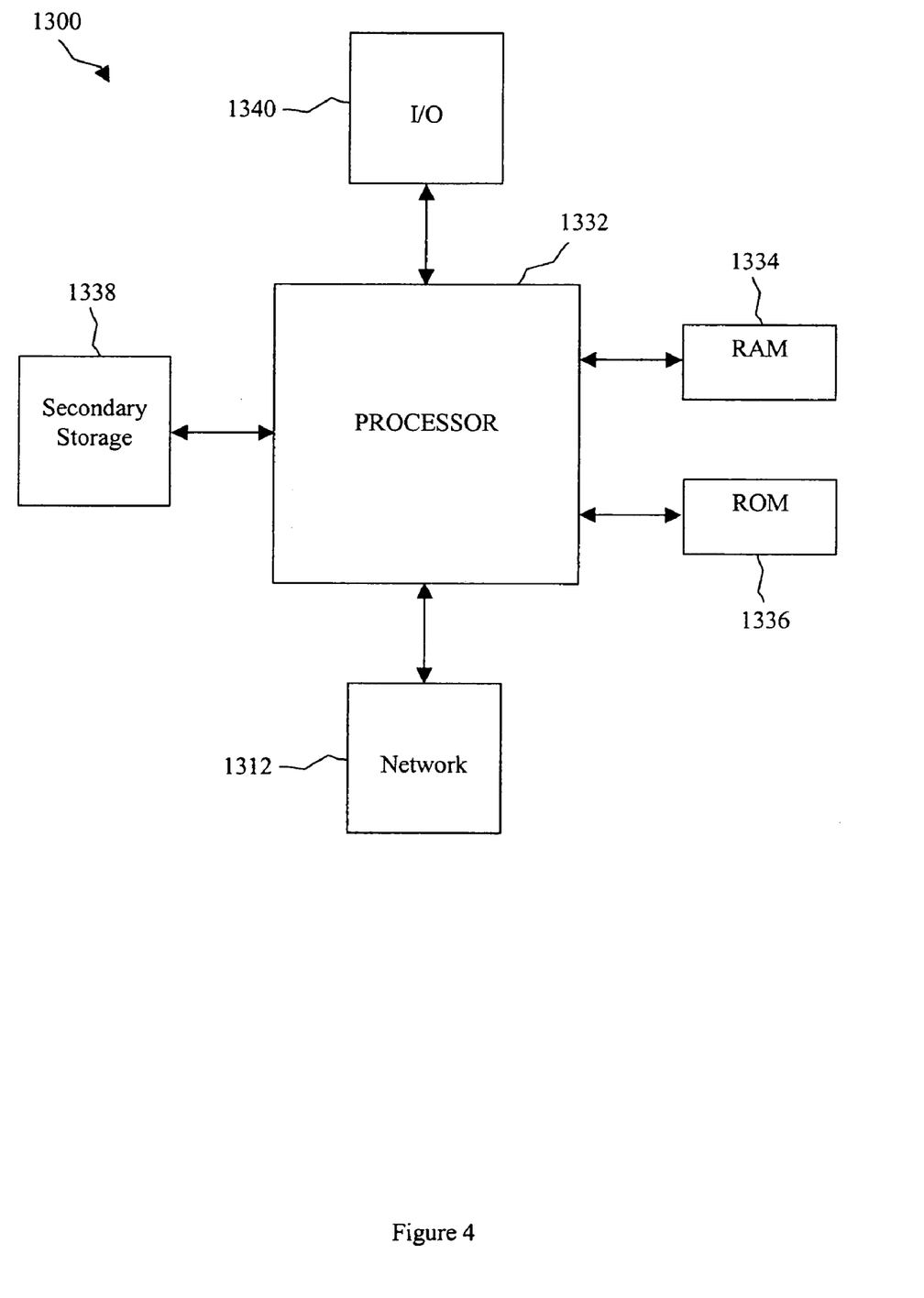
FIG. 4 illustrates an exemplary general-purpose computer system suitable for implementing the several embodiments of the present disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage 1338. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from a network or might output information to a network in the course of performing the above-described method steps.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, or scripts that it accesses from hard disk, floppy disk, optical disk (these various disk-based systems may all be considered secondary storage 1338), ROM 1336, RAM 1334, or the network connectivity devices 1312.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for determining status information based on one or more reporting applications providing a status summary, comprising:

a middleware layer receiving a first status summary from a first reporting application, wherein the first status summary is generated by the first reporting application from a first status report that is generated by the first reporting application from first status information provided to the first reporting application from a first underlying application;

the middleware layer receiving a second status summary from a second reporting application, wherein the second status summary is generated by the second reporting application from a second status report that is generated by the second reporting application from second status information provided to the second reporting application from a second underlying application;

the middleware layer storing the first status summary and the second status summary in a reporting data store;

the middleware layer processing the first status summary and the second status summary, wherein the first status summary and the second status summary comprise different formats;

the middleware layer providing to an interface a first status indicator based on the first status summary stored in the reporting data store and a second status indicator based on the second status summary stored in the reporting data store;

the middleware layer storing a new status summary in the reporting data store, wherein the new status summary is pushed to the middleware layer by the first reporting application, and wherein the new status summary is generated by the first reporting application from a new status report that is generated by the first reporting application from changed status information provided to the first reporting application from the first underlying application when the first status information changes;

receiving a selection of at least one of the first status indicator and the second status indicator in the interface; and displaying in the interface, data related to a corresponding status report from which a corresponding status summary symbolized by the at least one of the first status indicator and the second status indicator was generated.

2. The method of claim 1, wherein each status summary stored in the reporting data store is associated with a link specifying a location of a data display associated with the status summary, and wherein, when at least one of the plurality of status indicators is selected, the middleware layer consults the link to determine the location of a data display associated with the status summary associated with the selected status indicator, the middleware layer retrieves the data display, and the middleware layer causes the data display to appear in the interface.

3. The method of claim 2, wherein the data display is cached at the time the related status report is generated and is retrieved when at least one of the plurality of status indicators in the interface is selected.

4. The method of claim 2, wherein the data display is generated when at least one of the plurality of status indicators in the interface is selected.

5. The method of claim 2, further comprising combining a plurality of status summaries generated by a plurality of disparate reporting applications into an aggregated status summary and displaying an aggregated status indicator on the interface symbolizing the aggregated status summary.

6. The method of claim 5, responsive to receiving a selection of the aggregated status indicator, displaying on the interface, the plurality of status indicators representing the plurality of status summaries from which the aggregated status summary was derived.

7. The method of claim 6, responsive to receiving a selection of at least one of the plurality of status indicators representing the plurality of status summaries from which the aggregated status summary was derived, displaying on the interface, data related to a corresponding status report from which a corresponding one of the plurality of status summaries represented by the selected at least one of the plurality of status indicators was derived.

8. A system for determining status information based on one or more reporting applications providing a status summary, comprising:
    a plurality of underlying applications stored on a computer readable storage medium and executable by a processor to provide a plurality of status information;
    a plurality of reporting applications stored on a computer readable storage medium and executable by a processor to generate a plurality of status summaries, each of the plurality of reporting applications receives at least one of the plurality of status information from a corresponding one of the plurality of underlying applications and generates at least one status report including at least one status summary from the at least one of the plurality of status information;
    a middleware layer stored on a computer readable storage medium and executable by a processor to receive and process the plurality of status summaries, wherein at least some of the plurality of status summaries have different formats; and
    an interface stored on a computer readable storage medium and executable by a processor to be in communication with the middleware layer and to display a plurality of status indicators, each of the plurality of status indicators representative of a corresponding one of the plurality of status summaries;
    wherein responsive to selection of one of the plurality of status indicators, the interface displays a data display with a status report from which a status summary represented by the selected one of the plurality of status indicators was generated.

9. The system of claim 8, wherein the data display is cached at the time the related status report is generated and is retrieved when at least one of the plurality of status indicators in the interface is selected.

10. The system of claim 8, wherein the data display is generated when at least one of the plurality of status indicators in the interface is selected.

11. The system of claim 8, each of the plurality of reporting applications generates a plurality of status summaries in a plurality of formats and sends the plurality of status summaries to the middleware layer, the middleware layer processes the plurality of formats.

12. The system of claim 8, wherein, when one of the plurality of status information changes, a new status report and a new status summary incorporating the changed status information is generated.

13. A system for determining status information based on one or more reporting applications providing a status summary, comprising:
    a plurality of underlying applications stored on a computer readable storage medium and executable by a processor to provide status information;
    a plurality of reporting applications stored on a computer readable storage medium and executable by a processor to generate a plurality of status summaries, each of the plurality of reporting applications receives at least one of the plurality of status information and generates at least one status report including at least one status summary from the at least one of the plurality of status information;
    a middleware layer stored on a computer readable storage medium and executable by a processor to receive the plurality of status summaries, wherein at least some of the plurality of status summaries have different formats;
    an interface stored on a computer readable storage medium and executable by a processor to be in communication with the middleware layer and to display a plurality of status indicators, each of the plurality of status indicators representative of a corresponding one of the plurality of status summaries; and
    wherein the middleware layer stores each of the plurality of status summaries in a reporting data store associated with a link specifying a location of a data display associated with each of the plurality of status summaries, and wherein, when a corresponding one of the plurality of status indicators is selected, the middleware layer consults the link to determine the location of a data display associated with the status summary associated with the selected status indicator, the middleware layer retrieves the data display and displays the data display in the interface.

14. The system of claim 13, further comprising an aggregation component that generates an aggregated status summary of at least some of the plurality of status summaries.

15. The system of claim 14, wherein the combining of the plurality of status summaries occurs in at least one of:
    an aggregation component; and
    the reporting data store.

16. The system of claim 15, wherein responsive to an aggregated status indicator being selected, a plurality of status indicators are displayed on the interface, the plurality of status indicators representing the plurality of status summaries from which the aggregated status summary was derived, and wherein selecting at least one of the plurality of status indicators representing the plurality of status summaries from which the aggregated status summary was derived displays a data display on the interface, the data display being related to the status report from which the at least one of the plurality of status summaries related to the selected status indicator was derived.

\* \* \* \* \*